United States Patent [19]
Fiandra et al.

[11] Patent Number: 4,586,787
[45] Date of Patent: May 6, 1986

[54] LENS ASSEMBLY

[75] Inventors: Carlo L. Fiandra, New Canaan; Warren Deschenaux, Shelton, both of Conn.

[73] Assignee: The Perkin-Elmer Corporation, Norwalk, Conn.

[21] Appl. No.: 780,786

[22] Filed: Sep. 27, 1985

Related U.S. Application Data

[63] Continuation-in-part of Ser. No. 518,780, Jul. 29, 1983, abandoned.

[51] Int. Cl.⁴ ............................................. G02B 7/02
[52] U.S. Cl. .................................... 350/257; 350/252
[58] Field of Search ........................ 350/252, 256, 257

[56] References Cited

U.S. PATENT DOCUMENTS

| | | | |
|---|---|---|---|
| 2,394,894 | 2/1946 | Burgert et al. | 350/252 |
| 2,571,186 | 10/1951 | Baxter, Jr. | 350/252 |
| 2,817,998 | 12/1957 | Nieuwenhoven | 350/252 |
| 3,220,309 | 11/1965 | Wohler | 350/252 |
| 3,507,597 | 4/1970 | Brockway et al. | 356/110 |
| 3,521,945 | 7/1970 | Bristol et al. | 350/257 |
| 3,904,276 | 9/1975 | Whitaker et al. | 350/252 |
| 4,303,306 | 12/1981 | Dokawa | 350/252 |

OTHER PUBLICATIONS

Hopkins, R. E. "Some Thoughts on Lens Mounting", Optical Engineering, 9,10-1976, pp. 428-430.
Tibbetts et al., "Design & Fabrication of Microelectronic Lenses", Spie vol. 237, 1980, pp. 321-328.

Primary Examiner—William H. Punter
Attorney, Agent, or Firm—Richard C. Wilder; Thomas P. Murphy; Edwin T. Grimes

[57] ABSTRACT

The present invention is directed to a lens assembly which includes a lens element having a front face and a back face and a peripheral edge; a lens cell having an axial bore and a radially inwardly extending lens seat, the lens seat having a radially seating surface for engaging one of the lens faces, the peripheral edge of the lens element being radially spaced from the inner wall of the lens cell; a retainer ring mounted removably, adjustably, rigidly in the seating surface substantially equal to the thickness of the element, the retaining ring having a plurality of radially inwardly directed fingers which are disposed closely adjacent the other of the lens faces; and an adhesive disposed axially between the retainer ring fingers and the other lens face for tying the lens to the retainer after alignment of the lens whereby the lens and the retainer ring are removable from the lens cell as a single integral unit.

14 Claims, 11 Drawing Figures

LENS ASSEMBLY

This applications is a continuation-in-part of Application Ser. No. 518,780, filed July 29, 1983, and now abandoned.

FIELD OF INVENTION

This invention relates to lens assemblies and, more particularly, to new and improved lens mounting systems. It is particularly adapted, among other possible uses, for use in a refractive multiple lens assembly.

BACKGROUND OF THE INVENTION

Heretofore, most lenses were held in lens cells mechanically by using clips, clamps, retaining rings, epoxy, rolled lips, screws, etc.

While many successful lens systems have been fabricated, certain difficulties have been experienced with respect to the close positioning of the optical axis of each lens to a datum, and with the accurate, rigid and stable holding of each element to the housing without over constraint. In addition, prior art lens systems have not provided for convenient and accurate disassembly and assembly of lenses and cells.

The present invention is directed to overcome or at least ameliorate the foregoing problems encountered with such prior art systems, as will become apparent as the description proceeds.

SUMMARY OF THE INVENTION

In order to achieve the desired results, the present invention provides, in one form thereof, a new and improved lens assembly which includes a lens element having a front face and a back face and a peripheral edge. The assembly also includes a lens cell having an axial bore and a radially inwardly extending lens seat, said lens seat having a radially extending seating surface for engaging one of the lens faces. The peripheral edge of the lens element being radially spaced from the inner wall of the lens cell. Further, the lens assembly includes a retainer ring, means for removably, adjustably, rigidly mounting the retainer ring in the axial bore, spaced a preselected axial distance from the lens seating surface substantially equal to the thickness of the lens element. The retaining ring has a plurality of radially inwardly directed fingers, which are disposed closely adjacent the other of the lens faces. Also included in the lens assembly are adhesive means disposed axially between the retainer ring fingers and the other lens face for tying the lens to the retainer, thus forming an integral unit for ease of assembly and disassembly.

In one form of the invention, the lens element and the retainer ring are substantially circular, and the lens cell is substantially cylindrical.

There has thus been outlined rather broadly the more important features of the invention in order that the detailed description thereof that follows may be better understood, and in order that the present contribution to the art may be better appreciated. There are, of course, additional features of the invention which will be described hereinafter and which will form the subject of the claims appended hereto. Those skilled in the art will appreciate that the conception upon which the disclosure is based may readily be utilized as a basis for the designing of other assemblies for carrying out the several purposes of the invention. It is important, therefore, that the claims be regarded as including such equivalent assemblies as do not depart from the spirit and scope of the invention.

Several embodiments of the invention have been chosen for purposes of illustration and description, and are shown in the accompanying drawings, forming a part of the specification.

DETAILED DESCRIPTION OF THE INVENTION

Figure 1:
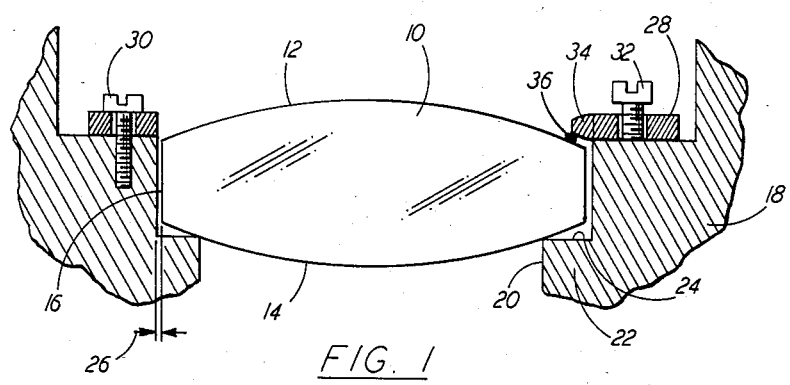
FIG. 1 is a transverse sectional view of a lens assembly constructed according to the concepts of the present invention.

Referring to FIG. 1, there is illustrated a lens assembly, which includes a convex lens element 10 having a front face 12, a back face 14 and a peripheral edge 16.

Further, the lens assembly of FIG. 1 includes a lens cell 18 having an axial bore indicated at 20. The lens cell has a radially inwardly extending lens seat 22, and the lens seat has a radially extending seating surface 24 for engaging the back face 14 of the lens element 10. The peripheral edge of the lens element 10 is radially spaced from the inner wall of the lens cell 18, as indicated at 26. This is a small clearance, the minimum being a function of both the relative differences of the coefficients of expansion of the lens element 10 and the lens cell 18 and of the change in temperature of the adjacent members over the maximum temperature range of operation. It permits good mechanical centering without the disadvantage of a small gap to put in the adhesive.

While the seat can extend around the entire periphery of the lens, in some installations it may be desirable to relieve portions of the seat so that all that remains is the portion appearing under the fingers 34.

Figure 3:
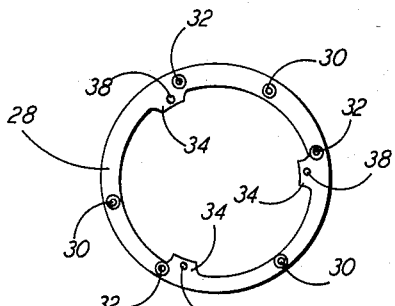
FIG. 3 is a plan view, drawn to a reduced scale, of a retainer ring used in the present invention.

Referring to FIGS. 1 and 3, the lens assembly also includes a retainer ring 28 and mean for removably, adjustably, rigidly mounting said retainer ring in the axial bore 20 spaced a preselected axial distance from the lens seating surface 24 substantially equal to the thickness of the lens element 10. In the embodiment illustrated in FIG. 1, the means for mounting the ring comprises a plurality of mechanical tie-in screws 30. In addition to the tie-in screws 30, a so-called epoxy resin pinning technique may be employed. This technique involves the use of at least two pins spaced, for example, 180° apart on the lens cell itself and two mating holes on the retainer ring. The pins have a very loose fit in the holes. For example, the pins could have a diameter of ⅛ inch and the holes could have a diameter of ¼ inch. When assembled, the space between the pin and the hole is filled with epoxy resin which when hard forms a very rigid mounting for the retainer ring. The epoxy resin constrains the ring from sliding and holds it in shear. As a result, the tie-in screws hold the ring axially and the epoxy resin holds it from moving radially. For removal purposes axial jack screws 32 are provided.

The retainer ring 28 has a plurality of radially inwardly directed fingers. In the illustrated embodiment, three fingers 34 are used. These fingers are disposed closely adjacent the front face 12 of the lens element 10. A clearance of the order of from about 0.020 inches to about 0.030 inches is desirable to minimize the thickness of the adhesive, thereby permitting the use of a room temperature vulcanizing rubber compound (RTV), which cures from the outside in.

It will be appreciated that the radial fingers 34 on the retainer ring 28 act as a secure fail-safe mechanism to retain the lens 10 in the cell 18, because the lens can't pass through the ring.

Figure 7:
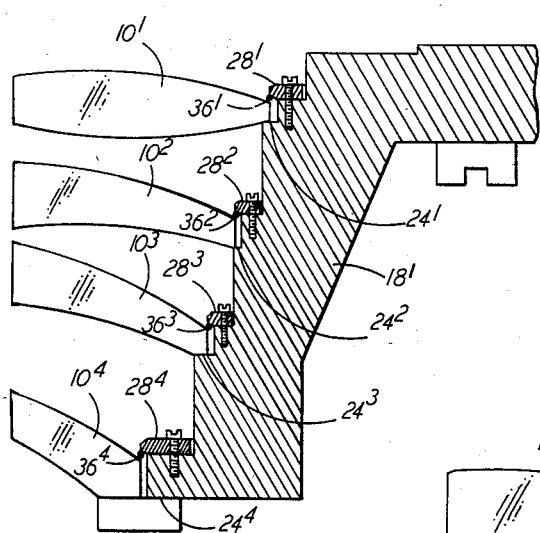
FIG. 7 is a fragmentary transverse sectional view of one embodiment of the invention.
Figure 8:
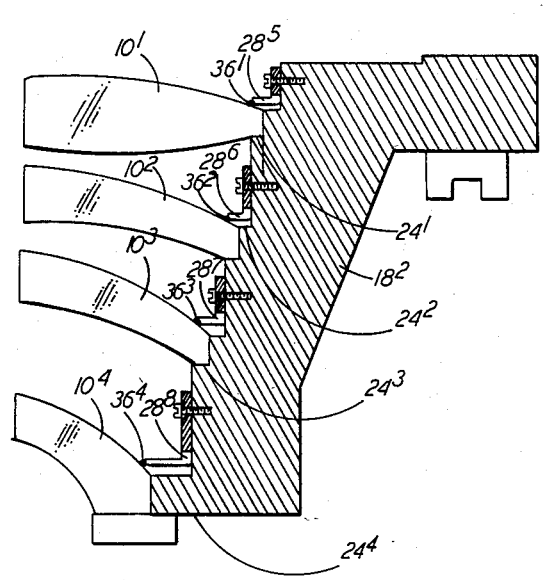
FIG. 8 is a fragmentary transverse sectional view similar to FIG. 7, but showing another embodiment of the invention.

At this point, with the lens 10 resting on the seating surface 24, and the retainer ring installed, the lens 10 can be aligned to the axis of the lens cell 18 and/or to other lenses in the same cell as shown in FIGS. 7 and 8. In addition, the lens 10 can be aligned to a second lens cell (not shown) co-axial with the lens cell 18 in which it is installed and/or to lenses (not shown) in that second cell. Any suitable means may be employed for adjusting the alignment of the lenses such as an interferometer, for example.

In addition, the lens assembly includes adhesive means 36 disposed axially between said retainer fingers 34 and the from face 12 of the lens element 10 for tying the lens to the retainer. It will be appreciated that the adhesive 36 is placed axially between the retaining ring fingers 34 and the lens 10. This takes up the difference in the mechanical tolerances, holds the lens, tends not to radially shift the lens and is easily applied. In addition, as pointed out above, the gap is small enough to minimize the thickness of the adhesive to thereby permit the use of RTV which cures from the outside in. Other suitable adhesive means may be used such as, for example, epoxy, paints, etc., as well as RTV.

By adhering the retainer ring 28 to the lens 10 an integral body is formed. That integral body, composed of the retainer ring 28 adhered to the lens 10, can be removed intact by, for example, the use of axial jack screws 32 as described hereinabove. This integral body can then be reinstalled in the lens cell 18 if desired.

Figure 4A:
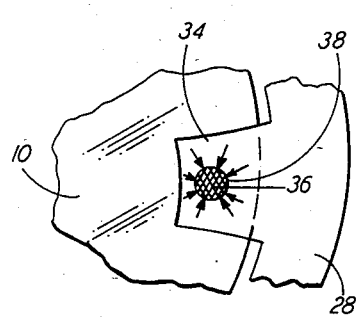
FIG. 4A is an enlarged plan view of a finger of a retaining ring in engagement with a lens element.
Figure 4B:
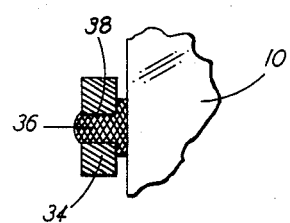
FIG. 4B is a traverse sectional view of the finger and lens element of FIG. 4A.
Figure 5A:
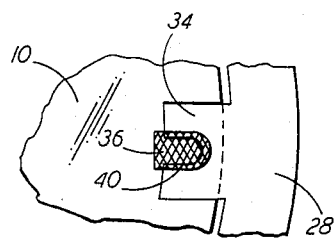
FIG. 5A is an enlarged plan view of a retaining ring finger in engagement with a lens element.
Figure 5B:
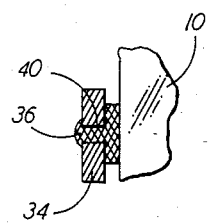
FIG. 5B is a transverse sectional view of the finger and lens element of FIG. 5A.
Figure 6A:
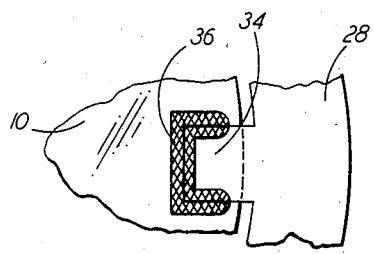
FIG. 6A is an enlarged plan view of a retaining ring finger in engagement with a lens element.
Figure 6B:
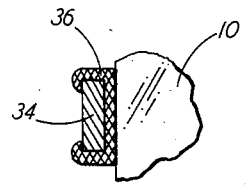
FIG. 6B is a transverse sectional view of the finger and lens element of FIG. 6A.

FIGS. 4A to 6B show three alternative means of securing the ring 28 to the lens element 10. In the embodiment of FIGS. 4A and 4B, each of the fingers 34 of the retaining ring 28 has an axially extending bore 38 where the adhesive 36 is placed. This results in uniform symmetrical stresses on the joined pieces, yielding minimum relative movement during curing. In the embodiment of FIGS. 5A and 5B, each of the fingers 34 of the retaining ring 28 has an axially extending slot 40 for receiving the adhesive means 36. FIGS. 6A and 6B show a retainer ring 28 having plain fingers 34.

Figure 2:
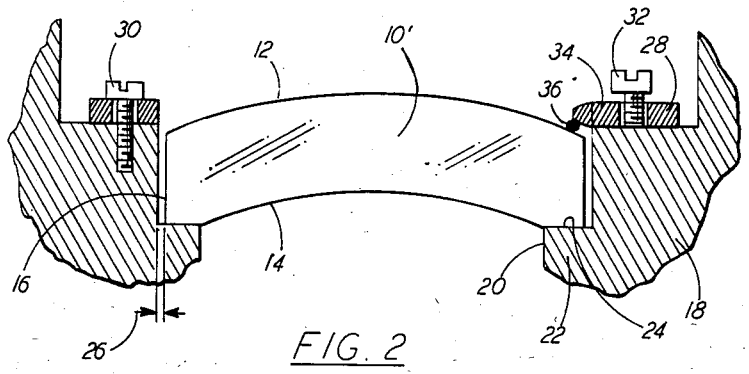
FIG. 2 is a transverse sectional view of a second lens assembly also constructed according to the concepts of the present invention.

The embodiment of the invention of FIG. 2 is the same as the embodiment of the invention of FIG. 1, except that the lens element is a concave lens 10' instead of a convex lens 10.

The embodiment of FIG. 7 is similar to the embodiments of FIGS. 1 and 2, except that the lens cell 18' has a plurality of stepped lens seating surfaces $24^1$, $24^2$, $24^3$, $24^4$ and there are a plurality of substantially parallel lens elements $10^1$, $10^2$, $10^3$, $10^4$, together with a like plurality of retaining rings $28^1$, $28^2$, $28^3$ and $28^4$. All of these elements perform in the same manner as their counterparts in FIGS. 1 and 2, described hereinbefore. The purpose of the stepped arrangement is to facilitate assembly and disassembly.

The embodiment of FIG. 8 is similar to the embodiment of FIG. 7, except that the retainer rings $28^5$, $28^6$, $28^7$, and $28^8$ are L-shaped in cross section and are radially mounted on the inner wall of the lens cell 182 instead of being axially mounted thereon. Otherwise all of the elements perform in the same manner as their counter-parts in FIGS. 1 and 2, as well as in FIG. 7, described above.

While the lens cells of FIGS. 7 and 8 can be machined from a casting or ring, they can also be fabricated. For example, the lens cell could comprise three axial rods disposed in a cone-like configuration, with a ring member on either end. The lens seating surfaces would be in line and carried by the rods at their appropriate axial positions.

It will thus be seen that the present invention does indeed provide a new and improved lens assembly wherein the lens elements are easily removable in view of the fact that they are tied to the retainer. When the screws holding the retainer to the cell are removed, the lens retainer, with attached lens, can be removed as an integral body by using the axial jacking screws or other means.

Although specific embodiments have been illustrated and described, it will be obvious to those skilled in the art that various modifications may be made without departing from the spirit and scope of the invention, which is to be limited solely by the appended claims.

What is claimed is:

1. A lens assembly comprising, in combination:
   a lens having a front face and a back face and a peripheral edge;
   a lens cell having an axial bore, said lens cell having a radially inwardly extending lens seat, said lens seat having a radially extending seating surface for engaging one of said lens faces, the peripheral edge of said lens being radially spaced from the inner wall of said lens cell;
   a retainer ring, means for removably, adjustably, rigidly mounting said retainer ring in said axial bore spaced a preselected axial distance from said lens seating surface substantially equal to the thickness of said lens, said retainer ring having a plurality of radially inwardly directed fingers, said fingers being disposed closely adjacent the other of said lens faces; and
   adhesive means disposed axially between said retainer ring fingers and said other lens face for tying said lens to said retainer ring after alignment of said lens whereby said lens and said retainer ring are removable from said lens cell as a single integral unit.

2. A lens assembly according to claim 1 wherein said lens element is substantially circular, said lens cell being substantially cylindrical, and said retainer ring being substantially circular.

3. A lens assembly according to claim 1 wherein said lens is a convex lens.

4. A lens assembly according to claim 1 wherein said lens is a concave lens.

5. A lens assembly according to claim 1 wherein there are a plurality of lenses, a like plurality of retainer rings and a like plurality of adhesive means.

6. A lens assembly according to claim 1 wherein said means for removably, adjustably, rigidly mounting said retainer ring in said axial bore comprises mechanical screw means.

7. A lens assembly according to claim 1 wherein there are three substantially equally spaced fingers carried by said retainer ring.

8. A lens assembly according to claim 1 wherein there is a clearance of between about 0.020 inches and about 0.030 inches between said fingers and said other lens face for receiving said adhesive means.

9. A lens assembly according to claim 1 wherein each of said fingers has an axially extending bore for receiving said adhesive means.

10. A lens assembly according to claim 1 wherein each of said fingers has an axially extending slot for receiving said adhesive means.

11. A lens assembly according to claim 1 wherein said adhesive means comprises a RTV type rubber compound.

12. A lens assembly according to claim 1 wherein said adhesive means comprises an epoxy resin adhesive.

13. A lens assembly according to claim 1 wherein the optical axis of said lens is aligned to the axis of said lens cell prior to adhering said retainer ring to said lens.

14. A lens assembly according to claim 5 wherein the optical axes of said plurality of lenses are aligned to each other and to the axis of said lens cell prior to adhereing said plurality of lenses to said plurality of retainer rings.

* * * * *